(12) United States Patent
Gapinski et al.

(10) Patent No.: US 12,134,377 B2
(45) Date of Patent: Nov. 5, 2024

(54) SYSTEMS AND METHODS FOR TRACTION LOCK ENGAGEMENT CONTROL FOR A POWER MACHINE

(71) Applicant: Doosan Bobcat North America, Inc., West Fargo, ND (US)

(72) Inventors: Austin Gapinski, Bismarck, ND (US); Chance Uhrig, Bismarck, ND (US); Boston Zachmann, Mandan, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 373 days.

(21) Appl. No.: 17/244,587

(22) Filed: Apr. 29, 2021

(65) Prior Publication Data
US 2021/0339730 A1    Nov. 4, 2021

Related U.S. Application Data

(60) Provisional application No. 63/017,293, filed on Apr. 29, 2020.

(51) Int. Cl.
*B60W 10/18* (2012.01)
*B60W 10/06* (2006.01)
*B60W 50/00* (2006.01)

(52) U.S. Cl.
CPC ............ *B60W 10/18* (2013.01); *B60W 10/06* (2013.01); *B60W 2050/0042* (2013.01); *B60W 2510/18* (2013.01); *B60W 2710/0644* (2013.01); *B60W 2710/18* (2013.01)

(58) Field of Classification Search
CPC ............... B60W 10/18; B60W 10/06; B60W 2050/0042; B60W 2510/18; B60W 2710/0644; B60W 2710/18
See application file for complete search history.

(56) References Cited

U.S. PATENT DOCUMENTS

| 5,481,455 | A | * | 1/1996 | Iwata | B60T 8/48 303/145 |
|---|---|---|---|---|---|
| 5,551,523 | A | | 9/1996 | Berg et al. | |
| 2006/0071541 | A1 | * | 4/2006 | Berg | F16H 61/66 303/89 |
| 2018/0305895 | A1 | * | 10/2018 | Durkin | E02F 3/3414 |

FOREIGN PATENT DOCUMENTS

| CN | 1861445 B | * | 7/2012 | | B60L 15/10 |
| EP | 1927778 A1 | | 4/2008 | | |
| WO | 2006036714 A1 | | 4/2006 | | |
| WO | WO-2013138693 A1 | * | 9/2013 | | B60W 10/02 |

OTHER PUBLICATIONS

Machine Translation of WO-2013138693-A1 PDF File Name: "WO2013138693A1".*
Machine Translation of CN 1861445 B PDF File Name: "CN1861445B_Machine_Translation.pdf".*

* cited by examiner

*Primary Examiner* — Grant Moubry
*Assistant Examiner* — Ruben Picon-Feliciano
(74) *Attorney, Agent, or Firm* — Quarles & Brady LLP

(57) ABSTRACT

A power machine can include a traction lock system to stop movement of the power machine. The traction lock system can include a controller configured to receive a brake input from an operator. In response to receiving the brake input, the controller can temporarily command a target (e.g., reduced) speed of the engine before engaging the brake.

21 Claims, 7 Drawing Sheets

SYSTEMS AND METHODS FOR TRACTION LOCK ENGAGEMENT CONTROL FOR A POWER MACHINE

CROSS-REFERENCE TO RELATED APPLICATIONS

The present application is based on, claims priority to, and incorporates herein by reference in its entirety, U.S. Provisional Patent Application No. 63/017,293, filed on Apr. 29, 2020, and entitled, "Systems and Methods for Traction Lock Engagement Control for a Power Machine."

BACKGROUND

This disclosure is directed toward power machines. More particularly, this disclosure provides systems and methods for controlling a traction lock system on a power machine. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

In general, power machines can include a parking brake system, which can be referred as a traction lock system. The traction lock system can be utilized to lock the tractive elements on a power machine (e.g., wheels or tracks) to stop or prevent the movement of the power machine. In some power machines, for example, the traction lock system can include a wedge or pawl brake system. In some cases, engagement of traction lock systems when the power machine is moving may cause excessive wear and tear on the components thereof.

The discussion above is merely provided for general background information and is not intended to be used as an aid in determining the scope of the claimed subject matter.

SUMMARY

Embodiments of the disclosed subject matter can use a controller to temporarily reduce the speed of an engine on a power machine before engaging a traction lock system. Among other benefits, this may help to provide a smooth engagement of the traction lock when the power machine is moving and reduce wear on and improve lifespan of components the traction lock system.

In some embodiments, a system for controlling a traction lock system on a power machine with an engine configured to drive tractive elements is provided. The system includes a brake configured to lock one or more tractive elements and a control system in communication with the engine and the brake. The control system includes at least one processor device and at least one memory storing instructions executable by the at least one processor device, the instructions when executed by the control system cause operations that include receiving a brake input for activation of the brake, in response to receiving the brake input, temporarily commanding the engine towards a predetermined engine speed, and after the engine is commanded towards the predetermined engine speed, engaging the brake based on the brake input to lock the one or more tractive elements.

In some embodiments, a method of controlling a traction lock system of a power machine is provided. The method includes receiving from an operator, at an electronic control system, a brake input for activation of a brake of the power machine. Based on receiving the brake input and before activating the brake, automatically providing an electronic signal to reduce a speed of an engine of the power machine. After providing the electronic signal to reduce the speed of the engine, electronically activating the brake, with the control system, based on the brake input.

In some embodiments, a power machine is provided. The power machine includes a main frame, an engine supported by the main frame and controlled by an engine throttle, a drive pump powered by the engine, and a drive motor driven by the drive pump and configured to power one or more tractive elements operably coupled to the drive motor. The power machine also includes a traction lock system including a brake and a control system. The brake is arranged between the drive motor and the one or more tractive elements and is configured to lock the one or more tractive elements. The control system is in communication with the engine throttle and the brake. The control system is configured to: receive a throttle signal corresponding to an operator-provided throttle setting, receive a brake input for activation of the brake, and in response to receiving the brake input, temporarily delay activation of the brake based on the brake input and output a modified throttle signal configured to control the engine throttle to temporarily command a reduction in engine speed.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

DETAILED DESCRIPTION

Figure 1:
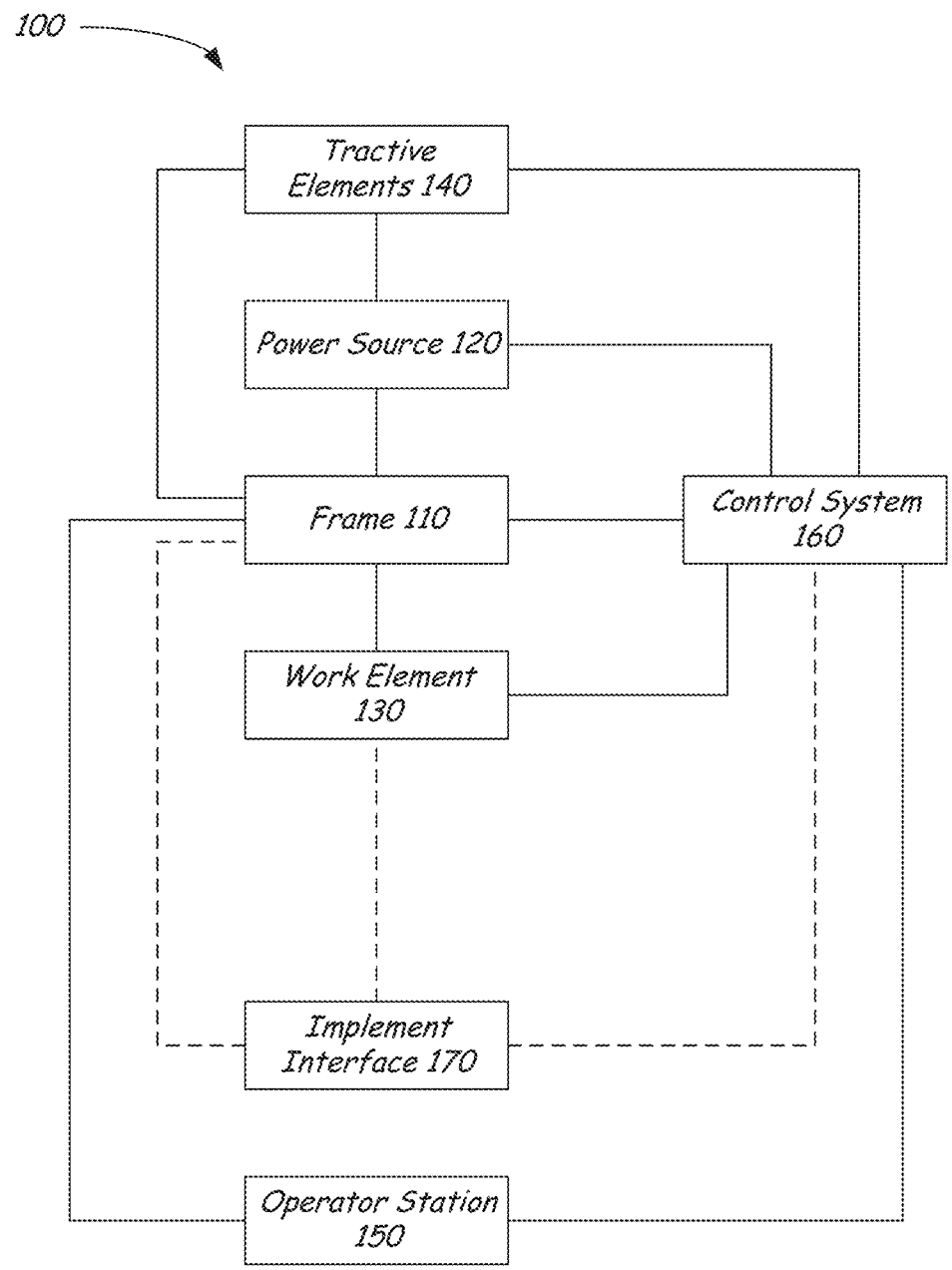
FIG. 1 is a block diagram illustrating functional systems of a representative power machine on which embodiments of the present disclosure can be advantageously practiced.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Also as used herein, unless otherwise indicated, the term "about," relative to a number, indicates a value that is within 10 percent of the number, inclusive of the endpoints of the range. For example, "about 1" indicates a value that is equal to or between 0.9 and 1.1.

With conventional designs, power machines may be equipped with a traction lock system for applying a brake to prevent the power machine from moving. In the case of known wedge or pawl brake systems, a locking component (e.g., a wedge or pawl) may be actuated by the traction lock system to engage with a rotary component to lock the drive components, and thus also lock the tractive elements of the power machine. In operation, the traction lock system can be actuated by an operator using a control switch, a pedal, or another input interface within the operator compartment of the power machine.

In conventional designs, a traction lock system can provide mechanical locking of tractive elements of a power machine, including when the power machine is under a load or when it is coasting. In the case of brake application when the power machine is under a load, for example, a rotary component that is engaged by the brake may be rotating at moderate speeds (e.g., as driven by an engine via a hydrostatic drive system). Thus, at the onset of the application of the brake, the locking component thereof may be moved to engage a moving component. Further, conventional actuation of the brake is typically undertaken without reference to the speed of the component that is to be braked. In other words, if an operator of the power machine actuates a traction lock system via an enabling input (e.g., from a brake input device within a cab), conventional traction lock systems will attempt to apply a brake irrespective of other parameters. Thus, in some cases, components of a traction lock system—and the power machine in general—may experience excessive loads or jarring impacts when a locking component of the system is moved to engage with a rotary component and thereby brake machine travel.

Further, if a rotary component that is to be engaged by a traction lock system is spinning at sufficient speeds, such as during operation at higher engine or drivetrain speeds, a locking component may not properly engage with the rotary component, at least initially. This may result in "grinding" contact between the components, similar to grinding of gears in a transmission during improper shifting. This grinding can also cause undesired wear on the components of the traction lock system. Moreover, as alluded to above, the locking component may still eventually engage or attempt to engage with the rotary component, even with the rotary component rotating a relatively high speed. This can result in a rapid and jarring speed reduction that can damage components of the traction lock system and can be generally undesirable for an operator of the power machines. In view of the issue above, for example, it may be useful to provide systems and methods for improved control of a traction lock system.

The embodiments disclosed herein can address these and other needs. For example, some embodiments can temporarily and automatically command a particular (e.g., reduced) engine speed for a power machine before causing a brake of a traction lock system to engage. In some cases, this can lead to a reduced rotational speed of the rotary component of the traction lock system before the brake is engaged, which can provide for a more controlled and reliable, and less jarring, application of the brake.

In some embodiments, a temporary command (e.g., temporarily commanded reduction) for engine speed can be initiated automatically based upon an operator providing a brake input or other enabling input. In other words, contrary to conventional systems, if an operator of the power machine wishes to actuate a traction lock system, an associated control system can sometimes reduce the engine speed prior to the application of the brake to a moving component, therefore allowing for a more controlled brake application and avoiding unnecessary wear on the power machine.

Figure 2:
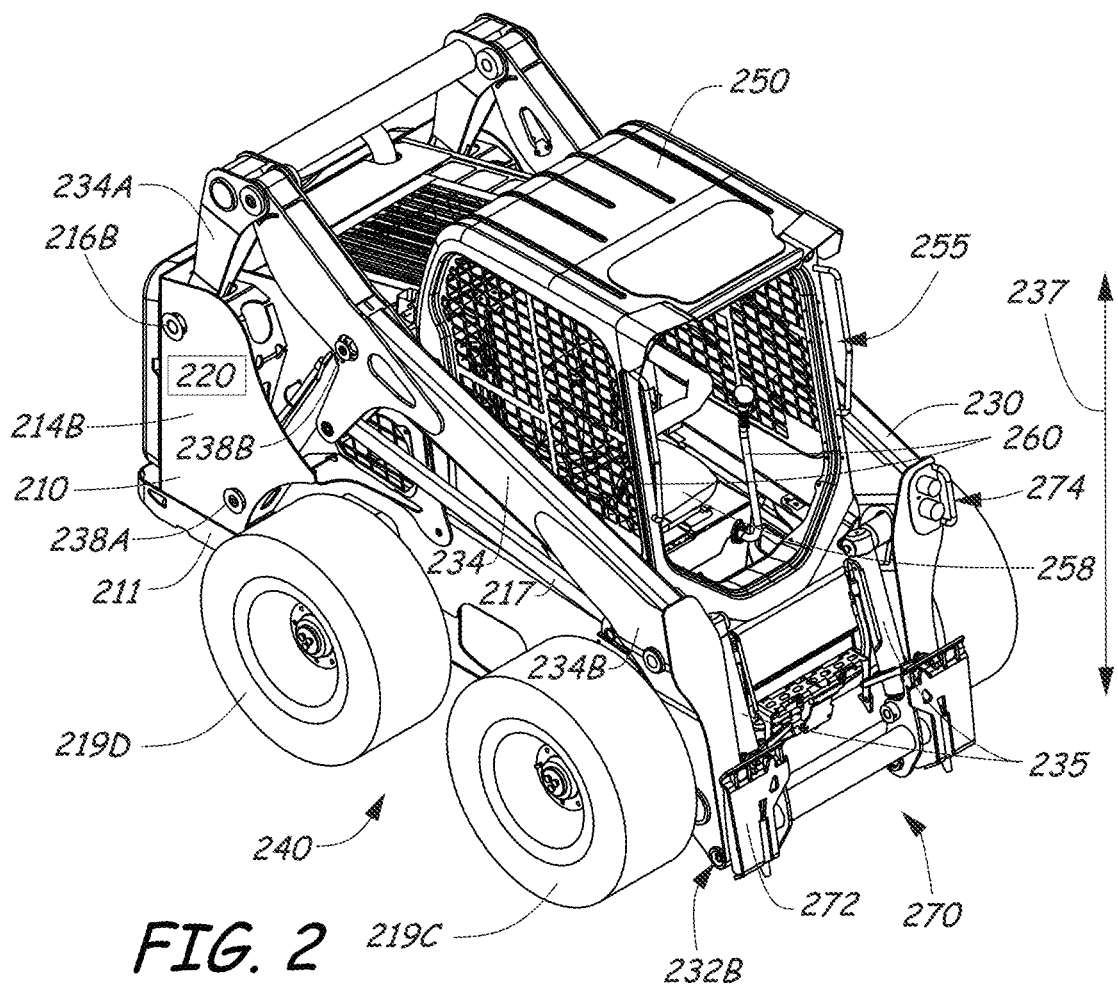
FIGS. 2-3 illustrate perspective views of a representative power machine in the form of a skid-steer loader of the type on which the disclosed embodiments can be practiced.
Figure 3:
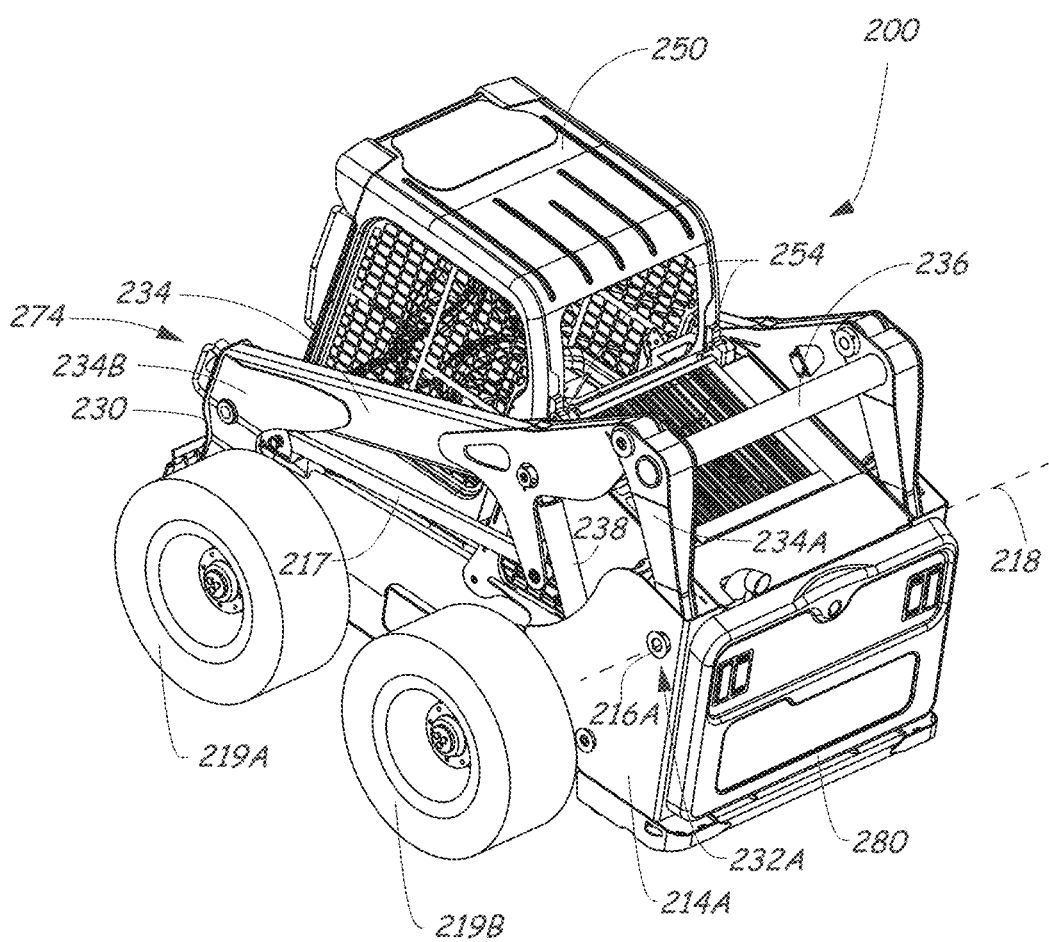

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end 232A of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the loader 200 to allow communication between a controller on an implement and electronic devices on the loader 200.

Figure 4:
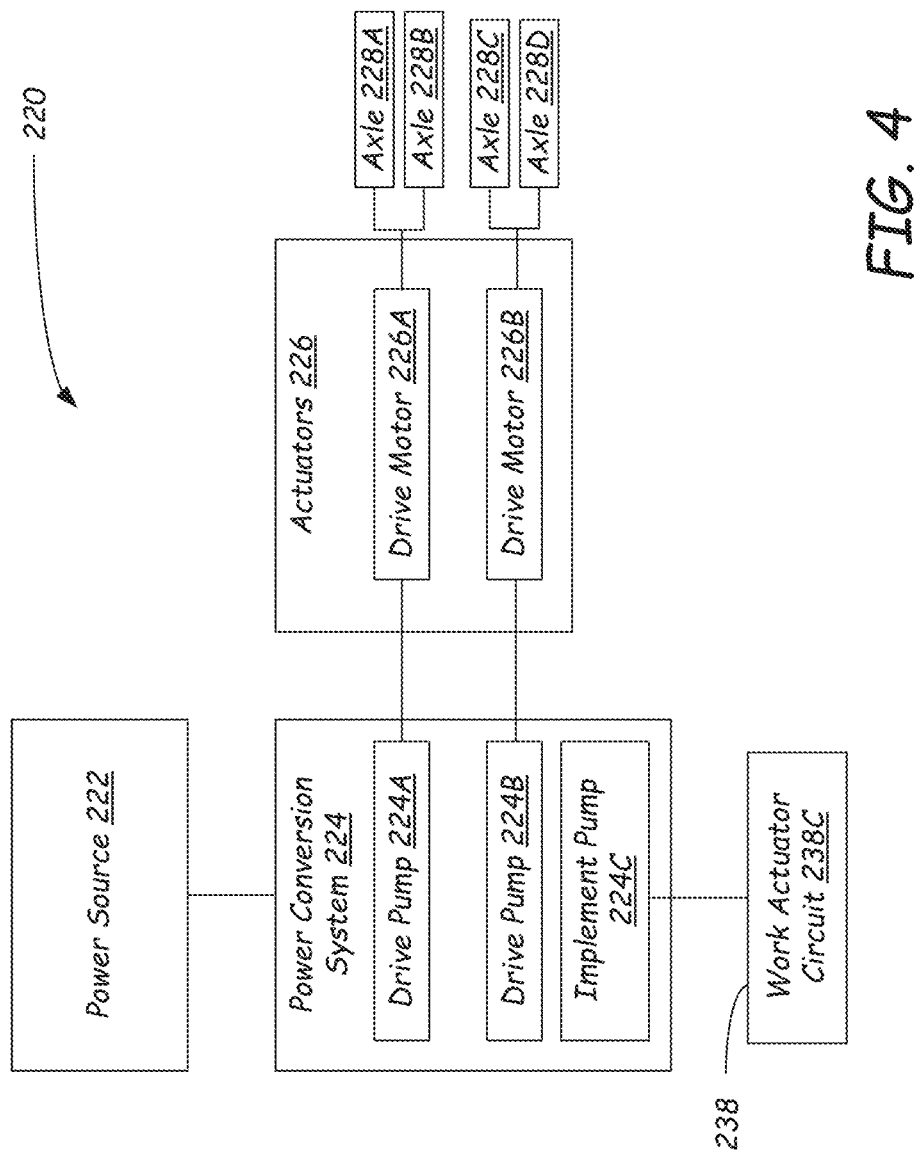
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement. The control logic of power machine 200 includes an open center, 3 spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
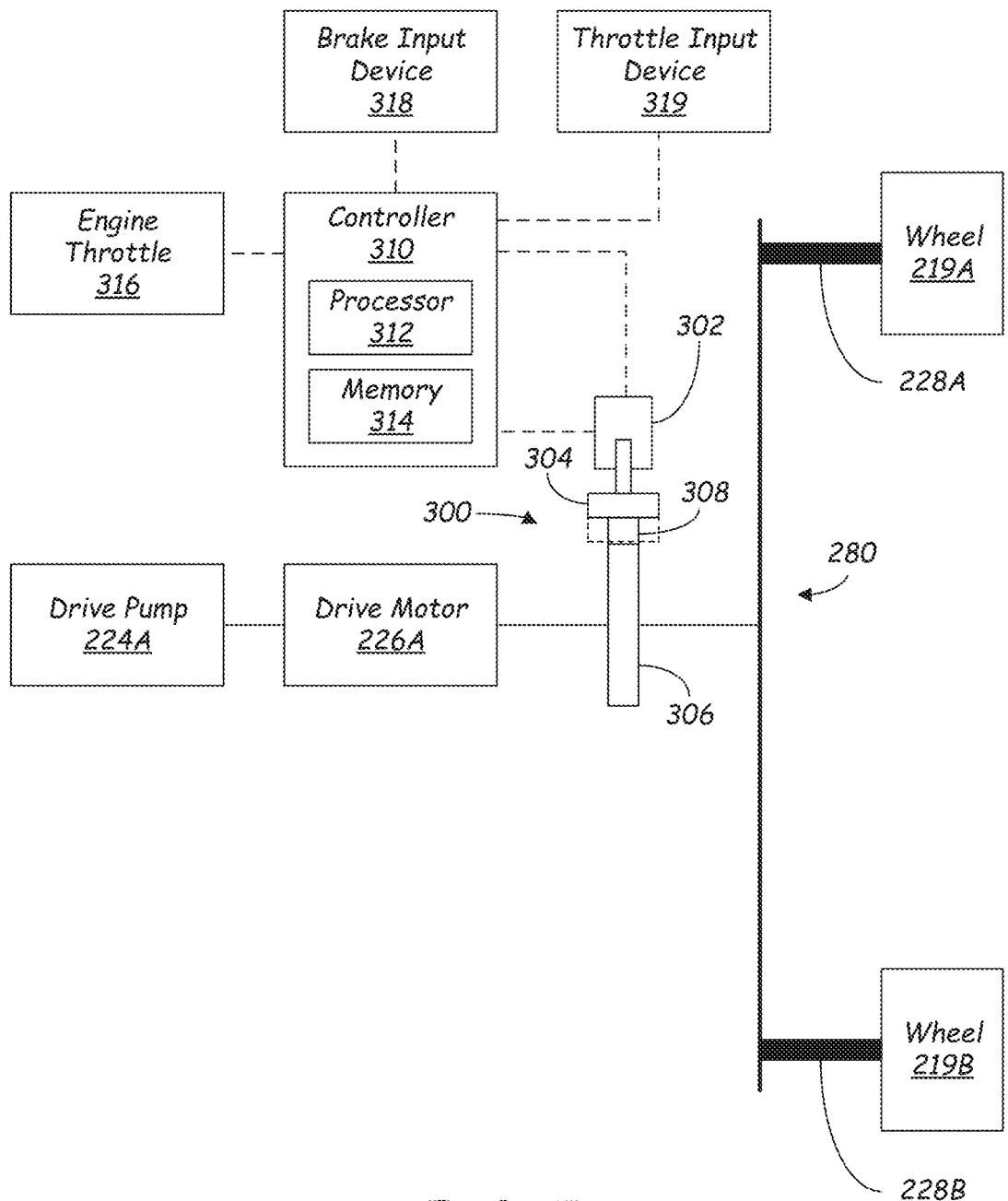
FIG. 5 is a schematic diagram illustrating components of a traction lock and associated control system of a loader such as the loader illustrated in FIGS. 2-3.

FIG. 5 includes a diagram of an improved traction lock system 300 according to an embodiment of the disclosure, among other components. As generally discussed above, and further detailed below, the traction lock system 300 can be configured to automatically reduce engine speed of a power machine before braking tractive elements of the power machine, and thereby to provide improved performance and lifespan of certain components as compared to conventional systems. Although the traction lock system 300 is illustrated in the context of certain components of the loader 200, the traction lock system 300 and other similar systems according to this disclosure can be advantageously used with other power machines having a variety of configurations for power trains or other systems (e.g., to brake rotate of other traction systems, or rotating components generally, than are shown in FIG. 5).

In the particular examples illustrated in FIG. 5, the traction lock system 300 is arranged to apply a traction lock mechanism between the drive motor 226A and the axles 228A, 228B, as may allow rotation of the wheels 219A, 219B to be stopped. As previously noted herein, an engine can be operably coupled to the drive pump 224A, through the power conversion system 224 (see FIG. 4), to power the drive motor 226A. The drive motor 226A is in turn operably coupled to the axles 228A, 228B, which are coupled to the wheels 219A, 219B, respectively, to maneuver the loader 200. For succinctness and clarity of illustration, only the drive components that operate wheels 219A, 219B will be described in the paragraphs to follow. Those skilled in the art recognize that the drive components that operate wheels 219C, 219D can be substantially similar. Further, as noted above, embodiments of the disclosed traction lock system can also be used with other traction systems or to brake other components of traction systems than are illustrated in FIG. 5 or expressly discussed below.

In the illustrated embodiment, the drive motor 226A delivers power to the wheels 219A, 219B through a chain and sprocket system 280. In particular, the drive motor 226A powers an output shaft, to which the traction lock system 300 is coupled. The end of the shaft can include one or more sprockets, which can be coupled to axles 228A, 228B via one or more chains to deliver power thereto and thus drive the wheels 219A, 219B. However, those skilled in the art will recognize various other approaches to transmit power from an output shaft to one or more axles (i.e., an appropriate gear train arrangement, etc.). As such, the chain and sprocket system 280 should not be considered as limiting to the scope of this disclosure. Further, some details regarding known aspects of chain and sprocket systems are otherwise outside the scope of this application and will not be described any further.

In general, the traction lock system 300 can act as a brake for the loader 200, stopping rotation of the wheels 219A, 219B by stopping rotation of the output shaft of the drive motor 226A. In some embodiments, including as illustrated in FIG. 5, a traction lock system can include a wedge brake system such as is described in U.S. Pat. No. 5,551,523, the entirety of which is incorporated herein by reference. However, other traction lock (or braking) systems are envisioned and the concepts discussed herein are not intended to be limited in their application to wedge brake systems. For example, other traction lock systems can include other suitable brake systems known in the art, including pawl or other brake systems that can be located within a motor housing (e.g., within a housing of the drive motors 226A, 226B) or elsewhere on a power machine.

As is also shown in FIG. 5, the traction lock system 300 includes a traction lock actuator 302, a wedge 304, and a disc 306. The traction lock actuator 302 is configured to exert a force on a plunger or actuator slug (e.g., via a solenoid) to move the wedge 304 between a retracted position (shown in solid lines in FIG. 5), in which the system 300 is disengaged from braking, and an extended position (shown in broken lines in FIG. 5), in which the system 300 is engaged with the disc 306 to brake the wheels 219A, 219B.

In some embodiments, the extended position may be a default position for the wedge 304 and the wedge 304 can be driven from the extended position to the retracted position upon energization of the traction lock actuator 302. For example, the brake can be normally engaged (e.g., held in the extended position via a spring) when power is removed from the traction lock actuator 302, and disengaged only when power is applied to the traction lock actuator 302 (e.g., via a controlled current signal). This can allow for the traction lock system 300 to lock the wheels 219A, 219B (i.e., engage the brake) in case of a loss of power to the traction lock actuator 302 or when the machine is not activated (i.e., the machine is turned off). In other embodiments, however, other arrangements are possible.

As previously described, the disc 306 is arranged between the drive motor 226A and the axles 228A, 228B and is connected to the output shaft of the drive motor 226A. As such, the disc 306 rotates at a disc speed that is proportional (or equal to) the speed of the output shaft of the drive motor 226A. The speed of the output shaft of the drive motor 226A is also proportional to the engine speed in the illustrated example, because the engine is operatively coupled to the drive pump 224A to power the drive motor 226A.

Figure 7:
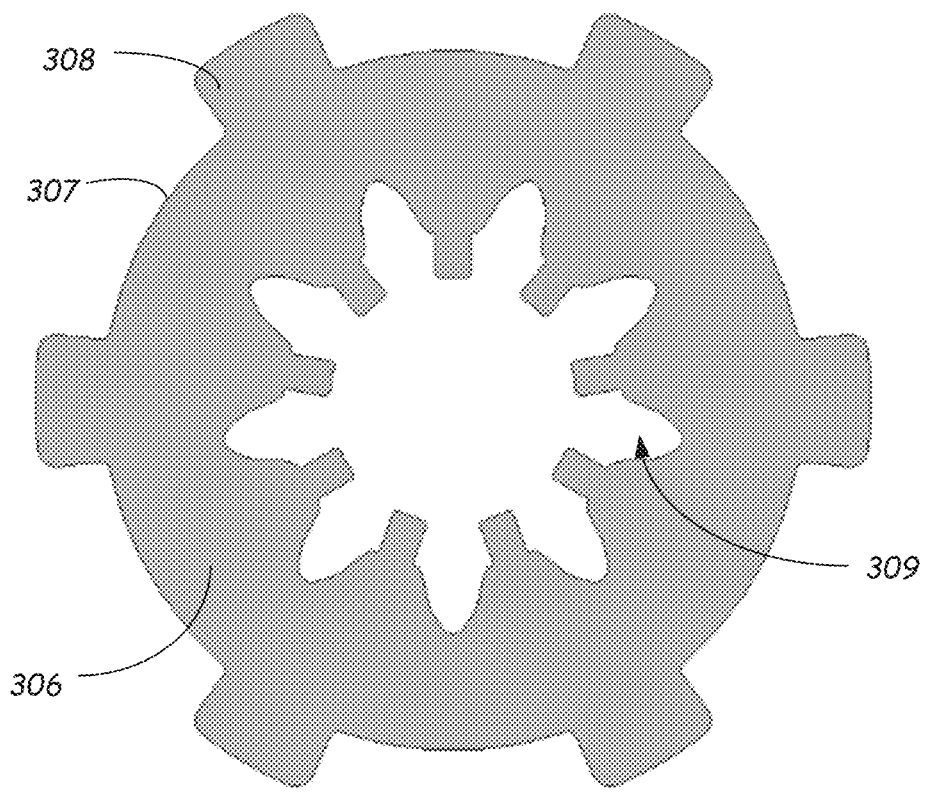
FIG. 7 is a side elevation view of an example brake disc of the type shown in the schematic diagram of FIG. 5.

As shown in FIG. 7, the disc 306 has a plurality of lobes 308 that protrude radially outward from a peripheral edge 307 thereof and a plurality of internal engagement features 309 for engaging an output shaft of the drive motor. For ease of illustration, only one lobe is shown in FIG. 5 Disc 306 is one example of such a disc; other types of discs can be used in other embodiments.

When the wedge 304 is in the extended position (as illustrated in broken lines), the wedge 304 engages the lobe 308 and thereby locks the disc 306 (and the wheels 219A, 219B) against rotation. In contrast, when the wedge 304 is in the retracted position (as illustrated in solid lines), the wedge 304 is held clear of the lobe 308 and thereby allows the disc 306 (and the wheels 219A, 219B) to rotate at a disc speed corresponding (e.g., proportional) to a speed of the engine. As generally noted above, similar operation of the wedge 304 or other brake elements (e.g., other wedges) can also simultaneously stop or allow rotation of other rotating elements (e.g., another disc) to brake or release the wheels 219C, 219D.

As also illustrated in FIG. 5, the traction lock actuator 302 is in communication with and configured to be controlled by a controller 310 (e.g., an electronic traction lock controller). In some embodiments, the controller 310 can be integrated into a larger control system such as the control system 160 (see FIG. 1), including as a hardware or software module of a general purpose or specialized control system for a power machine. In some embodiments, the controller 310 can be a stand-alone controller that may be in electronic communication with a larger control system.

In some embodiments, the controller 310 can be an integrated hardware or software module, on a hub, traction, engine, or other control unit for a power machine. In this regard, for example, discussion of the operation of the controller 310 below, or of an electronic traction lock controller generally, is not intended to necessarily require a dedicated or stand-alone controller, unless otherwise indicated. Similarly, unless otherwise expressly limited, discussion of an electronic traction lock controller or other controller is intended to include discussion of a more general purpose control system or device, one or more functions of which relate to control of a traction lock system.

In the illustrated embodiment, the controller 310 is configured for electronic control of the traction lock actuator 302 based on electronic inputs from other devices, although other configurations are possible (e.g., via other types of control signals or based on other types of inputs). Accordingly, the controller 310 includes a processor device 312 (e.g., a general or special purpose electronic processor) and a memory 314 that can store executable instructions for execution by the processor device 312, as well as various electronic input and output interfaces. Thus, the controller 310 is generally configured to receive electronic signals from and provide electronic signals to various other components, including to provide electrical signals (i.e., commands) to the traction lock actuator 302 to engage or disengage the brake.

The controller 310 is also in communication with the engine of the power machine 200, in order to control the speed of the engine. In the illustrated embodiment, the controller 310 can control engine speed via communication with an engine throttle 316 (e.g., an electronic throttle body), although other configurations may be possible. Further, although FIG. 5 illustrates the controller 310 as being directly in communication with the engine throttle 316, other control architectures are possible. For example, the controller 310 can be in communication with, or form part of, an engine control unit (not shown), and the engine control unit can be configured to control the engine throttle 316 based on signals from the controller 310.

In any case, as will be described in greater detail below, the controller 310 is generally configured to command the engine throttle toward a target setting, corresponding to a target engine speed, based on receiving signals from the brake input device 318. Where the target engine speed is lower than a current engine speed, such a command can cause the engine throttle 316 to change a speed of the engine, which ultimately changes a rotational speed of the disc 306 and a travel speed of the power machine 200. The engine throttle 316 is a mechanism that directly engages the fuel supply to the engine and is not to be confused with a user manipulable hand or foot device, commonly referred to as a throttle. For the purposes of this discussion, any such foot or hand operated device is referred to as an operator-controlled engine speed input such as a throttle input device 319. There are many known throttle input devices, including control levers, throttle pedals, throttle knobs, among others. It is to be understood that a throttle input device, as used herein, covers these as well as other known forms of operator-input devices for control of engine speed.

In the illustrated example, the throttle input device 319 is in communication with the engine controller 310 and is configured to output throttle signals based on operator input. The throttle input device 319 can thus be used by an operator of the power machine to command the engine, via the controller 310, to operate at a particular operational speed. In some cases, the operational speed can be set by a particular position of the throttle input device 319, which can correspond to a particular operational signal to the engine throttle 316 and an corresponding operational speed of the engine. For example, a minimum position of the throttle input device 319 can correspond to a minimum throttle signal and a minimum operational speed of the engine (e.g., an idle speed). Likewise, a maximum position of the throttle input device 319 can correspond to a maximum throttle signal and a maximum operational speed of the engine.

As further illustrated in FIG. 5, the controller 310 is also in communication with a brake input device 318. In general, the brake input device 318 can be a brake switch, pedal, or other interface that is configured to be actuated by an operator and provide a corresponding brake input signal to the controller 310. In some embodiments, the brake input device can include an electronic brake pedal or operator-controllable button or knob within an operator compartment, which can output a brake pedal position or other brake signal to the controller 310 (e.g., directly or via an intervening architecture) based on operator commands for activation or deactivation of the brake. In some embodiments, the brake pedal can be an over center foot pedal that, once operated, will remain in the "ON" position until the foot pedal is positively moved and released. Thus, for example, the brake input device 318 can sometimes be configured to provide a continuous brake input signal to the controller 310, so that the traction lock system 300 is continually engaged to brake the power machine 200, until an operator provides a contrary indication. In some embodiments, the brake input device 318 can be a sensor that senses the position of some other device such as a seat bar located within an operator compartment. Movement of a seat bar from a lowered to a raised position can provide a signal to the controller 310 that the controller will interpret as an indication that the brake should be engaged. In some embodiments, a power machine can have both a brake switch of the type described above and a seat bar or other similar device that each can provide, independently of each other, a signal to the controller 310 that the controller should engage or disengage the traction lock system 300. The controller 310 would be suitably configured with instructions stored in memory to process either or both types of inputs.

As similarly discussed above, under conventional systems, when a traction lock actuator is engaged to brake a power machine, braking may be implemented (e.g., with a wedge similar to the wedge 304) even while the braked component (e.g., a disc similar to the disc 306) may be rotating at relatively high speeds. This is especially true on machines with a mechanical or hydraulic connection between drive inputs operable by operator and drive pumps, with the drive inputs being manipulated to control displacement of the drive pumps. Correspondingly, the braking components may not appropriately engage (e.g., a wedge may skip along a corresponding disc) or may experience jarring or otherwise detrimental contact when, for example, a wedge engages a lobe on a corresponding disc that is moving. These effects can result in degradation of the relevant components as well as sub-optimal overall operation of the power machine.

Figure 6:
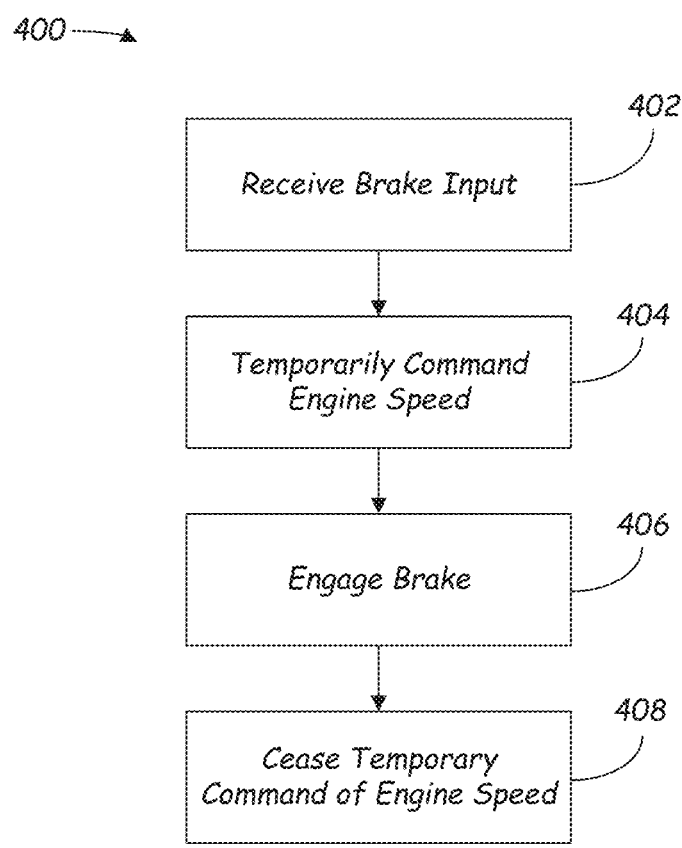
FIG. 6 is a flow chart illustrating a method for controlling a traction lock system such as the system illustrated in FIG. 5.

Accordingly, in some embodiments, a controller can be configured to reduce the rotational speed of a rotating component that is to be braked by reducing the speed of the engine, before the brake is engaged with the rotating component. In this regard, referring also to FIG. 6, a control method 400 for traction lock engagement can include one or more operations for reducing engine speed based on brake inputs before a relevant component is braked. For clarity, the operations of the braking method 400 are described below with reference to the traction lock system 300 of FIG. 5, although similar operations can be implemented using other control systems and other control methods can be implemented by the system 300.

In particular, in the illustrated embodiment, the controller 310 is configured to temporarily delay operator-provided brake and throttle inputs to command the engine towards a target engine speed (e.g., a predetermined minimum speed). Initially, the controller 310 can receive 402 a brake input, such as an electronic signal from the brake input device 318. In response to receiving 402 the brake input, the controller 310 can then temporarily command 404 the engine speed of the power machine toward a temporary target speed (e.g., a reduced speed). In this regard, for example, as also discussed above, the controller 310 can cause electronic signals to be relayed to the engine throttle 316, directly or indirectly, to temporarily reduce the speed of the engine (i.e., reduce the RPM of the engine) based on receiving 402 a brake input. For example, the engine may be operating at an operational speed that corresponds to an operator-provided throttle setting, when the controller 310 receives 402 a brake input. The controller 310 can then temporarily delay the operator-commanded activation of brake and temporarily output a modified throttle signal to control the engine throttle 316 and thereby command a reduction in engine speed. For example, the controller 310 can temporarily output an engine speed command signal that is reduced in magnitude (or otherwise) relative to a command signal that would otherwise correspond to an operator-commanded throttle setting. As noted above, in some cases, the controller 310 can command 404 the engine speed towards a predetermined (e.g., minimum) speed, and can thus generally reduce engine speed based on receiving 402 a brake input.

As also noted above, a predetermined engine speed can be less than an operational engine speed that corresponds to the present operator-provided throttle setting when a relevant brake input is received. In some implementations, however, a predetermined engine speed can be equal to an operational engine speed that corresponds to the present operator-provided throttle setting. For example, if the power machine 200 is operating at idle speed, a target engine speed based on brake input may match the operating speed (i.e., may also be the idle speed). Thus, for example, a traction lock controller can temporarily command an engine throttle to an idle setting, to command the engine toward an idle speed, even though an operator input device is already set to idle, such that the throttle was already at an idle setting. In some cases, this may usefully ensure that any increase in an operator-commanded throttle setting during the relevant interval does not result in a prematurely increased engine speed.

As noted above, according to some embodiments, a predetermined engine speed can be equal to a minimum engine speed, corresponding to a minimum throttle setting. According to other embodiments, a predetermined engine speed can be a target percentage of a current operating speed or of a current operational target speed based on an operator-commanded throttle setting. For example, a predetermined engine speed can be 80% of a current operating speed (e.g., or 70%, 60%, etc.) or the predetermined engine speed can correspond to a 10% reduction in speed relative to the current operating speed (e.g., 25%, 45%, etc.).

Once the engine speed has been temporarily reduced or otherwise commanded 404, the controller 310 can then cause the brake to engage 406, such as via electronic control of the traction lock actuator 302. Thus, for the illustrated configuration, the wedge 304 can be moved to engage the lobes 308 on the disc 306 with the disc 306 rotating at a lower speed than when the brake input was first received 402. And, correspondingly, the disc 306 can be braked in a generally less jarring manner, and with reduced (e.g., no) skipping of the wedge 304 along the disc 306.

As noted above, a commanded 404 reduction in engine speed effected under the braking method 400 is generally temporary. Accordingly, in some embodiments, after the brake has been engaged 406, the controller 310 can control the engine throttle 316 to return the engine to its previous speed, or at least to cease 408 the temporarily commanded 404 engine speed that resulted from the received 402 brake input. For example, the controller 310 can be configured to return the engine to an operating speed corresponding to an operator-provided throttle setting indicated by the throttle input device 319. In this regard, for example, a temporarily commanded 404 reduction in engine speed under the braking method 400 may sometimes overlap with a reduction in engine speed caused by other processes (i.e., a change in input from an operator-controlled engine speed input), with a net effect that the engine may not necessarily return to the pre-braking speed even after the reduction in engine speed is no longer being commanded 404. In some embodiments, the controller may not return the engine speed to the previous engine speed level (i.e., the operation in block 408 may not be executed).

In some embodiments, a controller can be configured to command 404 a reduction in engine speed (or other target speed) only for a predetermined time after receiving a brake input. For example, the controller 310 may generally be configured to reduce the engine speed for between about 50 milliseconds and about 2 seconds. According to some embodiments, the controller 310 may be configured to reduce the engine speed for between about 200 milliseconds and about 1850 milliseconds, for between about 400 milliseconds and about 1200 milliseconds, or for about 800 milliseconds. In any case, the controller can generally be configured to cause a reduction in engine speed for a predetermined period of time after receiving 402 a brake input, regardless of any input from an operator-controlled engine speed input. As appropriate, after the predetermined time has elapsed, the controller can cease 408 to command the engine speed (e.g., cease the temporary delay of the activation of the brake and the temporary modification of throttle control), with the engine speed then potentially returning to an operating speed corresponding to an operator-provided throttle setting, returning to a previous value, or generally increasing.

In some embodiments, a controller can be configured to cease 408 commanding reduction of engine speed only upon occurrence of a physical condition. For example, a controller can be configured to command 404 a reduction in engine speed, based on receiving 402 a brake input, until the engine achieves a target reduced engine speed. According to another example, a controller can be configured to command 404 a reduction in engine speed at least until a brake has been properly engaged with a component that is to be braked. In this regard, in some implementations, the controller 310 can be configured to detect whether the wedge 304 is in proper engagement with the disc 306, such as via input from a position or force sensor (not shown). In such a case, for example, the controller 310 can be configured to detect a position of the wedge 304 directly, to detect a current configuration (e.g., degree of extension) of the traction lock actuator 302, or to detect other parameters such as the speed of the disc 306 or other components. Correspondingly, the controller 310 can sometimes continue to command 404 a reduction in engine speed until the wedge 304 is determined to be properly engaged and the disc 306 properly braked, and only then allow the engine speed to again increase. According to other embodiments, a controller can be configured to cease 408 a temporary command of engine speed upon receiving a brake input for deactivation of the brake.

In some embodiments, a controller can be configured to reduce engine speed before engaging a brake only if the engine speed is above a predetermined threshold (e.g., a predetermined RPM). For example, the controller 310 can be in communication with a speed sensor for the engine to detect the engine speed. If the engine is above a predetermined engine speed, the controller 310 can then command 404 a speed reduction before controlling the traction lock actuator 302 to engage the wedge 304 with the disc 306. Conversely, if the engine is below the predetermined engine speed, the controller 310 can control the traction lock actuator 302 to engage the wedge 304 with the disc 306 without commanding 404 a reduction in the speed of the engine.

Similarly, in some embodiments, a controller can be configured to reduce engine speed before braking, or to not reduce engine speed before braking, based on detected speeds of other components. For example, sensors (not shown) can be configured to detect a speed of the drive motor 226A or of the disc 306, and the controller 310 can be configured to command 404 a particular engine speed (or not) accordingly. Or similar control can be implemented based on a speed of certain tractive elements (e.g., wheels 219A, 219B or tracks) or other components.

In some embodiments, a controller can monitor multiple parameters to determine when to cease the temporary delay in brake activation and modification of throttle inputs from an operator. For example, the controller 310 can be configured to command the engine to an operating speed corresponding to an operator-provided throttle setting based on the occurrence of the earlier of factors that include an end of a predetermined time delay (e.g., as described above), identification by the controller 310 that the brake has locked the tractive elements (e.g., wheels 219A, 219B), and receiving a brake input for deactivation of the brake.

In some embodiments, aspects of this disclosure, including computerized implementations of methods according to this disclosure, can be implemented as a system, method, apparatus, or article of manufacture using standard programming or engineering techniques to produce software, firmware, hardware, or any combination thereof to control a processor device or a computer (e.g., a processor device operatively coupled to a memory) to implement aspects detailed herein. Accordingly, for example, some embodiments can be implemented as a set of instructions, tangibly embodied on a non-transitory computer-readable media, such that a processor device can implement the instructions based upon reading the instructions from the computer-readable media. Some embodiments can include (or utilize) a device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Certain operations of methods according to some embodiments, or of systems executing those methods, may be represented schematically in the FIGs. or otherwise discussed herein. Unless otherwise specified or limited, representation in the FIGs. of particular operations in particular spatial order may not necessarily require those operations to be executed in a particular sequence corresponding to the particular spatial order. Correspondingly, certain operations represented in the FIGs., or otherwise disclosed herein, can be executed in different orders than are expressly illustrated or described, as appropriate for particular embodiments. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Although the present invention has been described by referring preferred embodiments, workers skilled in the art will recognize that changes may be made in form and detail without departing from the scope of the discussion.

What is claimed is:

1. A system for controlling a traction lock system on a power machine with an engine configured to drive one or more tractive elements, the system comprising:
    a brake configured to lock one or more tractive elements; and
    a control system in communication with the engine and the brake, the control system including at least one processor device and at least one memory storing instructions executable by the at least one processor device, the instructions when executed by the control system causing operations that comprise:
        receiving a brake input for activation of the brake;
        in response to receiving the brake input, temporarily commanding the engine towards a predetermined engine speed that is less than an operating speed of the engine that corresponds to an operator-provided throttle command when the brake input is received; and
        delaying engagement of the brake based on the brake input until after the engine is commanded towards the predetermined engine speed.

2. The system of claim 1, wherein the operations further comprise:
    after engaging the brake, commanding the engine to the operating speed corresponding to the operator-provided throttle command.

3. The system of claim 2, wherein the predetermined engine speed is a minimum engine speed corresponding to a minimum throttle setting.

4. The system of claim 1, wherein the control system is configured to command the engine towards the predetermined engine speed for a predetermined time before engaging the brake based on the brake input.

5. The system of claim 4, wherein the predetermined time is between about 50 milliseconds and about 2 seconds.

6. The system of claim 1, wherein the control system is in electronic communication with an engine throttle and is configured to control the engine throttle to command the engine towards the predetermined engine speed.

7. The system of claim 6, wherein a position of a throttle input device defines an operational throttle signal correlating to the operating speed of the engine; and
    wherein the control system is configured to provide a modified throttle signal to the engine throttle to command the engine towards the predetermined engine speed.

8. The system of claim 7, further comprising:
    an engine controller that is in communication with and controls the engine throttle;
    wherein the engine controller is configured to receive the modified throttle signal from the control system and provide the modified throttle signal to the engine throttle.

9. The system of claim 1, wherein the brake comprises:
    a traction lock actuator;
    a wedge coupled to the traction lock actuator and moveable by the traction lock actuator between a retracted position and an extended position; and
    a disc with a plurality of lobes extending radially outward therefrom, wherein the lobes are configured to engage with the wedge when the traction lock actuator moves the wedge to the extended position.

10. The system of claim 1, wherein the control system is configured to temporarily reduce the speed of the engine towards the predetermined engine speed, based on receiving the brake input, to one of an idle speed or a target percentage of a current engine speed.

11. A method of controlling a traction lock system of a power machine, the method comprising:
    receiving from an operator, at an electronic controller, a brake input for activation of a brake of the power machine;
    determining an operating speed of an engine of the power machine that corresponds to an operator-provided throttle setting when the brake input is received;
    based on receiving the brake input and before activating the brake, automatically providing an electronic signal to reduce the operating speed of the engine to a target engine speed that is less than the operating speed that corresponds to the operator-provided throttle setting; and
    delaying engagement of the brake based on the brake input until after the electronic signal to reduce the operating speed of the engine is provided.

12. The method of claim 11, wherein the brake is configured to stop rotation of a disc that is powered by a mechanically controlled hydraulic pump and a corresponding hydraulic motor.

13. The method of claim 11, wherein the electronic signal to reduce the operating speed of the engine is configured to command the engine towards an idle speed.

14. The method of claim 11, further comprising:
    automatically commanding a return of the engine to the operating speed that corresponds to the operator-provided throttle setting, based on one or more of an end of a predetermined time delay, the brake being activated, or the electronic controller receiving a brake input for deactivation of the brake.

15. A power machine comprising:
    a main frame;
    an engine supported by the main frame and controlled by an engine throttle;
    a drive pump powered by the engine;
    a drive motor driven by the drive pump and configured to power one or more tractive elements operably coupled to the drive motor; and a traction lock system including a brake that is arranged between the drive motor and the one or more tractive elements and is configured to lock the one or more tractive elements, and a control system in communication with the engine throttle and the brake, including one or more electronic controllers;

wherein the control system is configured to:

receive a throttle signal corresponding to an operator-provided throttle setting;

receive a brake input for activation of the brake; and in response to receiving the brake input, temporarily delay activation of the brake based on the brake input and output a modified throttle signal configured to control the engine throttle to temporarily command a reduction in engine speed relative to the operator-provided throttle setting.

16. The power machine of claim 15, wherein the control system is configured to engage the brake to lock the one or more tractive elements, based on the brake input, following a predetermined delay after receiving the brake input.

17. The power machine of claim 16, wherein the predetermined delay is between about 50 milliseconds and about 2 seconds.

18. The power machine of claim 17, wherein the predetermined delay is between about 400 milliseconds and about 1200 milliseconds.

19. The power machine of claim 16, wherein the control system is further configured to command the engine to an operating speed corresponding to the operator-provided throttle setting based on the occurrence of the earlier of: an end of the predetermined delay, the control system identifying that the brake has locked the one or more tractive elements, and the control system receiving a brake input for deactivation of the brake.

20. The power machine of claim 15, wherein the modified throttle signal corresponds to a minimum throttle setting for the engine throttle.

21. The power machine of claim 15, wherein the brake comprises:

a traction lock actuator;

a wedge coupled to the traction lock actuator and moveable by the traction lock actuator between a retracted position and an extended position; and a disc with a plurality of lobes extending radially outward therefrom, wherein the lobes are configured to engage with the wedge when the traction lock actuator moves the wedge to the extended position.

* * * * *